US012391280B2

(12) United States Patent
Nageswaran et al.

(10) Patent No.: US 12,391,280 B2
(45) Date of Patent: Aug. 19, 2025

(54) METHOD FOR ASCERTAINING A SPATIAL ORIENTATION OF A TRAILER

(71) Applicant: Robert Bosch GmbH, Stuttgart (DE)

(72) Inventors: Ganesh Nageswaran, Benningen am Neckar (DE); Benjamin Haas, Stuttgart (DE); Daniel Eckstein, Stuttgart (DE); Daniel Kuhner, Marbach (DE); Jannik Steinkamp, Stuttgart (DE); Benjamin Classen, Weinsberg (DE); Eva Zimmermann, Reutlingen (DE); Robert Herzig, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 143 days.

(21) Appl. No.: 17/668,522

(22) Filed: Feb. 10, 2022

(65) Prior Publication Data

US 2022/0258766 A1    Aug. 18, 2022

(30) Foreign Application Priority Data

Feb. 17, 2021    (DE) ..................... 10 2021 201 522.0

(51) Int. Cl.
*B60W 60/00*    (2020.01)

(52) U.S. Cl.
CPC ... *B60W 60/0015* (2020.02); *B60W 2300/145* (2013.01); *B60W 2520/22* (2013.01); *B60W 2530/201* (2020.02); *B60W 2540/18* (2013.01); *B60W 2554/80* (2020.02)

(58) Field of Classification Search
CPC ....... B60W 60/0015; B60W 2300/145; B60W 2520/22; B60W 2530/201; B60W 2540/18; B60W 2554/80
See application file for complete search history.

(56) References Cited

U.S. PATENT DOCUMENTS

| | | | | |
|---|---|---|---|---|
| 9,922,565 | B2* | 3/2018 | Thomas | G08G 1/163 |
| 10,276,049 | B2* | 4/2019 | Prasad | G01S 13/88 |
| 10,488,504 | B2* | 11/2019 | Di | G01S 7/411 |
| 10,816,939 | B1* | 10/2020 | Coleman | G01S 17/86 |
| 10,928,511 | B2* | 2/2021 | Nasser | G01S 13/87 |
| 10,955,540 | B2* | 3/2021 | Wang | G01S 13/08 |
| 11,531,114 | B2* | 12/2022 | Dimitrov | G05D 1/0251 |
| 2005/0058323 | A1* | 3/2005 | Brodsky | G06V 10/255 |
| | | | | 382/104 |

(Continued)

FOREIGN PATENT DOCUMENTS

| | | |
|---|---|---|
| DE | 102015109537 A1 | 12/2015 |
| DE | 102019131702 A1 | 5/2020 |

(Continued)

*Primary Examiner* — Aryan E Weisenfeld
(74) *Attorney, Agent, or Firm* — NORTON ROSE FULBRIGHT US LLP

(57) ABSTRACT

A method for ascertaining a spatial orientation of a trailer of an autonomously driving towing vehicle with trailer. In the method, sensor data of a plurality of different sensor types are processed, so that the trailer and objects in the environment are identified in the sensor data, the sensor data communicated by the various sensor types and processed in this way being combined with one another, and the movement path of the trailer relative to the objects in the environment being determined on the basis of these combined sensor data.

12 Claims, 2 Drawing Sheets

(56) References Cited

U.S. PATENT DOCUMENTS

| | | | |
|---|---|---|---|
| 2009/0005932 A1* | 1/2009 | Lee | G01S 13/862 |
| | | | 701/41 |
| 2010/0156667 A1* | 6/2010 | Bennie | B60C 23/0408 |
| | | | 340/902 |
| 2012/0140061 A1* | 6/2012 | Zeng | G01S 13/726 |
| | | | 348/148 |
| 2015/0325126 A1* | 11/2015 | Schwindt | B60D 1/62 |
| | | | 701/36 |
| 2016/0162743 A1* | 6/2016 | Chundrlik, Jr. | G06T 7/277 |
| | | | 348/148 |
| 2017/0242095 A1* | 8/2017 | Schuh | G05D 1/0293 |
| 2017/0334484 A1* | 11/2017 | Koravadi | G06V 20/56 |
| 2018/0025499 A1* | 1/2018 | Strano | B62D 13/06 |
| | | | 340/431 |
| 2018/0045823 A1* | 2/2018 | Prasad | G01S 13/931 |
| 2018/0203106 A1* | 7/2018 | Di | G01S 13/87 |
| 2018/0284243 A1* | 10/2018 | Wood | G05D 1/0234 |
| 2019/0056736 A1* | 2/2019 | Wood | G05D 1/0246 |
| 2019/0225154 A1* | 7/2019 | Ionascu | G06F 18/256 |
| 2019/0265714 A1* | 8/2019 | Ball | G05D 1/0221 |
| 2019/0278272 A1* | 9/2019 | Zhao | G01M 17/00 |
| 2019/0340787 A1* | 11/2019 | Ramirez Llanos | B60D 1/62 |
| 2019/0346856 A1* | 11/2019 | Berkemeier | G05D 1/0212 |
| 2020/0183008 A1* | 6/2020 | Chen | G01S 17/88 |
| 2020/0217952 A1* | 7/2020 | Rider | G01S 13/58 |
| 2020/0333436 A1* | 10/2020 | Insana | G01S 13/449 |
| 2020/0389760 A1* | 12/2020 | Ghannam | G07C 5/008 |
| 2022/0153306 A1* | 5/2022 | Imran | G06F 18/256 |
| 2022/0219698 A1* | 7/2022 | Singh | G06V 20/56 |
| 2022/0358677 A1* | 11/2022 | Critchley | G06T 7/70 |

FOREIGN PATENT DOCUMENTS

| | | | | |
|---|---|---|---|---|
| EP | 3282284 A1 | 2/2018 | | |
| WO | WO-2015200450 A1 * | 12/2015 | | B60Q 9/002 |
| WO | 2019084398 A1 | 5/2019 | | |
| WO | WO-2020205648 A1 * | 10/2020 | | B60W 30/182 |
| WO | 2021007427 A1 | 1/2021 | | |

* cited by examiner

METHOD FOR ASCERTAINING A SPATIAL ORIENTATION OF A TRAILER

FIELD

The present invention relates to a method for ascertaining a spatial orientation of a trailer of an autonomously driving towing vehicle with trailer. In addition, the present invention relates to a device for carrying out such a method.

BACKGROUND INFORMATION

In autonomously driving vehicles, in particular towing vehicles with trailers, it is important to acquire the state of the trailer in order to gain knowledge of its angle relative to the towing vehicle, its position, its speed, its dimensions, etc.

The acquisition of the state of the trailer is used for many purposes. On the one hand, knowledge of the state of the trailer is indispensable for planning collision-free, safe trajectories of the truck-trailer unit. On the other hand, it is also important to improve the performance of the overall object recognition and tracking.

PCT Patent Application No. WO 2019/084398 A1 describes a system and a method with which an angle and the distance between a towing vehicle and a trailer of an autonomously driving tractor-trailer are ascertained. The tractor-trailer includes a plurality of sensors with which, in addition to the distance and the angle, the surrounding environment and the objects therein are also recognized. On the basis of the data thus ascertained, the tractor-trailer is autonomously controlled.

In the related art, potentiometer-supported angle measurement sensors are used to measure the angle of the trailer. Here, the main goal is the recognition and avoidance of potential jackknife situations of the truck-trailer combinations. Standardly, such sensors are high in cost and are suitable only for a particular type of trailer.

SUMMARY

An object of the present invention is to provide a method for ascertaining a spatial orientation of a trailer of an autonomously driving towing vehicle with trailer, with which a reliable and economical determination of the orientation of various trailer types is possible.

In order to achieve the object, the method for ascertaining a spatial orientation of a trailer, in accordance with the present invention, is provided. Advantageous developments of the present invention are disclosed herein.

In accordance with an example embodiment of the present invention, a method is provuded for ascertaining a spatial orientation of a trailer of an autonomously driving towing vehicle with trailer, in which sensor data of a plurality of different sensor types are processed, so that the trailer and objects in the environment are identified in the sensor data, the sensor data communicated by the various types of sensors and processed in this way being combined with one another, and the path of movement of the trailer relative to the objects in the environment being determined on the basis of these combined sensor data.

In the sense of the present invention, the spatial orientation is understood as the orientation of the trailer with respect to the towing vehicle and with respect to the other objects in the environment. The various sensor types here are sensors based on various measurement designs. Preferably, sensors are used such as camera sensors, lidar sensors, radar sensors, or ultrasonic sensors. From the sensor data obtained via these sensors, objects in the environment, such as persons or other traffic participants, as well as the trailer, are identified.

A "combination of the sensor data" is understood as meaning that the identified trailer and the objects in the environment from all sensor data are used to ascertain the movement path of the trailer. Here, the movement path is understood as the lane, direction of travel, or direction of movement. The combination of sensors has the advantage that weaknesses in one type of sensor can be compensated by the other sensor types. In this way, it is thus possible even in foggy conditions, darkness, or rain to nonetheless be able to identify the trailer and the objects in the environment so that it remains possible to ascertain a movement path. In this way, the reliability required in particular for autonomous driving is achieved.

In addition, no redundant sensors need be provided, because the redundancy is already provided by the different sensor types. In addition to the movement path of the trailer, preferably the movement paths of traffic participants are also ascertained. This is preferably ascertained in the same step as the ascertaining of the movement path of the trailer. In this way, a movement path of the trailer can be determined by which the trailer can be safely steered through traffic.

Generally, a large number of sensors are required for autonomous driving. In a preferred embodiment of the present invention, the sensor data are ascertained with the sensors used for the autonomous driving. This has the advantage that no additional sensors are required for the ascertaining of the spatial orientation of the trailer. In this way, the method can be carried out at low cost. Preferably, the sensors are all situated on the towing vehicle, so that there does not have to be a communicative connection between the towing vehicle and the trailer. This further simplifies the method.

In a further preferred example embodiment of the present invention, an estimation filter is used for the determination of the movement path of the trailer. Preferably, a Kalman filter is used as estimation filter. Using such an estimation filter, system variables that are not directly measurable are estimated, while the errors of the measurements are optimally reduced. Using such an estimation filter, the accuracy of the determination of the movement path is thus increased.

Preferably, the trailer is identified in the sensor data on the basis of trailer dimensions, the position of the support point, and a towing vehicle steering angle. On the basis of these data, the initial identification of the trailer at the beginning of the method can be improved. The wheel rotational speed can also be used as further values.

In an advantageous development of the present invention, the dimensions of the trailer are determined from the respective sensor data using a dimension estimation algorithm. Generally, the dimensions, or extensions, of the trailer are known. Despite this, using the dimension estimation algorithm, it is possible to estimate the dimensions of the trailer from the sensor data.

In this way, trailers having different sizes can also be used. The trailer is preferably detected at the beginning of a trip, so that the dimension estimation algorithm only has to be executed once.

Advantageously, the identification of the trailer in the sensor data is done using a deep learning algorithm. A deep learning algorithm has the advantage that after a training a high identification rate can be achieved. This improves the reliability of the method.

In a further advantageous embodiment of the present invention, a factor is calculated indicating how reliably the trailer has been identified in the respective sensor data. This factor determines how reliably the trailer has been recognized on the basis of, for example, the quality of the sensor data, the recognized shape of the trailer, the weather conditions, and the current function status of the sensor. In this way, a value can be calculated with which a statement can be made about the reliability of the recognition, so that for sensor types having higher factors this trailer identification given the combination of sensor types is weighted higher than for sensor types having lower factors. Correspondingly, a more accurate and more reliable identification of the trailer can be made.

According to a useful example embodiment of the present invention, the identification of the trailer in the respective sensor data is rejected if the factor is below a specified value. This value indicates, as it were, a required minimum reliability for the identification of the trailer. Correspondingly, through the selection of a determined value a required minimum reliability can be set, so that unreliable identifications of the trailer do not cause worsening of the result. Correspondingly, in this way the reliability and the accuracy of the identification of the trailer can be improved.

According to a further useful embodiment of the present invention, for the identification of the trailer in the sensor data the previously ascertained movement path of the trailer is used as a basis. Here, the movement path results from preceding measurements. On the basis of the movement path of the trailer, it can be predicted approximately where the trailer will be at the moment of the measurements. In this way, incorrect measurements that could occur due to improbably large deviations in the predicted position of the trailer can be excluded. In particular, the trailer can still be identified even given, for example, poor visibility. Overall, in this way the ascertaining is simplified and the reliability is increased.

Preferably, the identification of the trailer is carried out during a detected state of the towing vehicle. Here, a detected state of the towing vehicle is a state in which the position of the trailer can be inferred on the basis of measured values of the towing vehicle, such as steering angle, speed, etc. For example, given a steering angle of 0° over a determined period of time and a particular speed, it can be assumed that the trailer is situated in a line with the towing vehicle. In such a state, the identification is also simplified.

The object of the present invention may also be achieved by a device for carrying out the method of the present invention, the device including at least two different sensor types and a processing unit for identifying the trailer in the sensor data and for ascertaining the movement path of the trailer from the sensor data. Such a device has the advantages cited in relation to the method.

BRIEF DESCRIPTION OF THE DRAWINGS

Exemplary embodiments of the present invention are shown in the figures and are explained in more detail in the following description.

DETAILED DESCRIPTION OF EXAMPLE EMBODIMENTS

Figure 1:
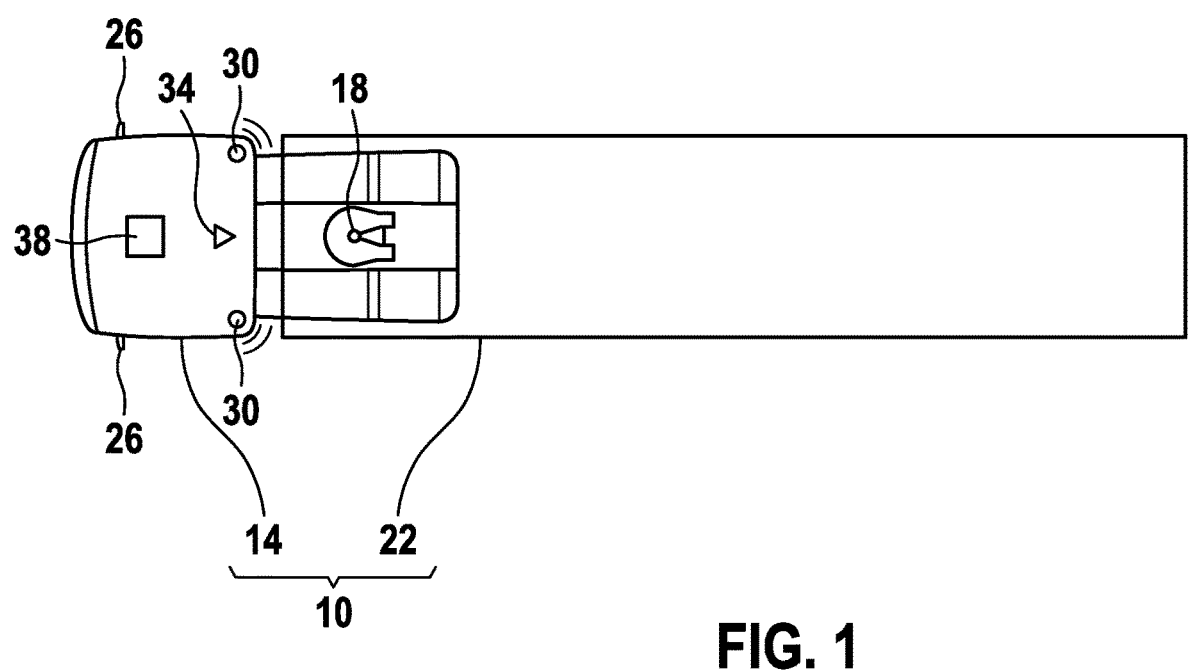
FIG. 1 shows a towing vehicle with trailer, with an exemplary embodiment of a device for carrying out the method, in accordance with the present invention.

FIG. 1 shows a towing vehicle with trailer 10, with an exemplary embodiment of a device for carrying out the method. Towing vehicle with trailer 10 is made up of a towing vehicle 14 and a trailer 22 connected thereto via a support point 18. In this exemplary embodiment, towing vehicle 14 has at least two camera sensors 26 that are situated on outside mirrors of towing vehicle 14 and face toward the rear. Given good visibility, trailer 22 is detectable via these camera sensors 26.

On towing vehicle 14, in addition there are situated at least two radar sensors 30, also facing the rear, for the detection of trailer 22. In this exemplary embodiment, in addition at least one lidar sensor 34 is configured in the direction of trailer 22. All sensors 26, 30, 34 are connected to a processing unit 38 provided in towing vehicle 14, so that the sensor data of all these sensors 26, 30, 34 can be communicated to processing unit 38 for further processing.

Figure 2:
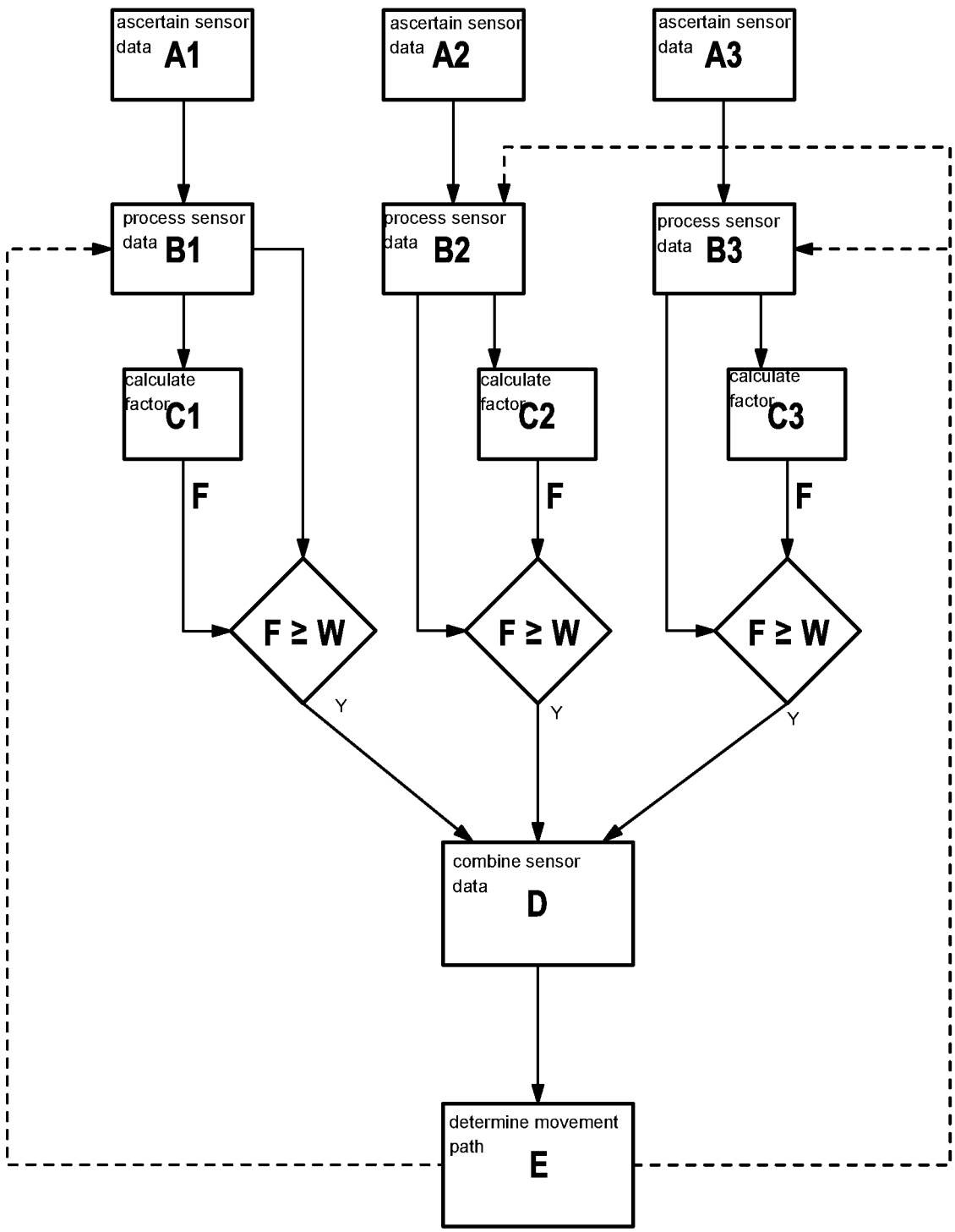
FIG. 2 shows an exemplary embodiment of the method according to the present invention for ascertaining a spatial orientation of the trailer.

FIG. 2 shows a method for ascertaining a spatial orientation of a trailer 22 according to an exemplary embodiment of the present invention. Parts of this method can be carried out in processing unit 38 shown in FIG. 1. In a first step A (A1, A2, A3), the sensor data of the three different sensors 26, 30, 34 are ascertained. These sensor data are in particular data in which a rear region of towing vehicle with trailer 10 is acquired. In this way, data are ascertained with which the spatial orientation of trailer 22 can be ascertained. In addition to these data, odometry data and a towing vehicle steering angle of towing vehicle with trailer 10 can be ascertained. Although trailer 22 per se is not acquired with these data, these data can be helpful in the identification of the trailer.

In a next step B (B1, B2, B3), the sensor data are processed. In this step, in the respective sensor data trailer 22 and objects in the environment are identified. Here, objects in the environment may be for example other traffic participants, or construction work in the roadway. Trailer 22 is here identified for example by a deep learning method that has been trained on a recognition of trailer 22 for the respective sensor type.

In a further step (C1, C2, C3), on the basis of the thus ascertained trailer 22 a factor F is calculated indicating how reliably trailer 22 was able to be identified in the sensor data. This factor F determines how reliably trailer 22 has been recognized on the basis of, for example, the quality of the sensor data, the recognized shape of trailer 22, the weather conditions, and the current function status of sensor 26, 30, 34. If the resulting factor F is greater than or equal to a predefined value W, these sensor data are forwarded. If, on the other hand, the factor F is smaller than the value W, the corresponding sensor data are not forwarded in order to not worsen the overall result.

The forwarded sensor data are combined in a step D, so that, in a final step E, the movement path of trailer 22 relative to the recognized objects in the environment can be determined from these sensor data combined in this way. For easier identification of trailer 22 in step B, the movement path recognized in step E can be used as an aid in step B.

What is claimed is:

1. A method for ascertaining a spatial orientation of a trailer of an autonomously driving towing vehicle with trailer, the method comprising the following steps:
  processing respective sensor data of each of a plurality of different sensor types to identify the trailer and objects in an environment in each of the respective sensor data;
  combining the processed respective sensor data with one another; and
  determining a movement path of the trailer relative to the objects in the environment based on the combined sensor data, wherein a factor is calculated indicating how reliably the trailer was identified in each of the respective sensor data, wherein when the factor is greater than or equal to a specified value, the sensor data is forwarded to the processing, the combining, and the determining, wherein a value of the factor varies depending on whether the respective sensor data is from a first one of the different sensor types or from a second one of the different sensor types.

2. The method as recited in claim 1, wherein the respective sensor data are ascertained with sensors used for the autonomous driving.

3. The method as recited in claim 1, wherein an estimation filter is used to determine the movement path of the trailer.

4. The method as recited in claim 1, wherein the trailer is identified in the sensor data based on dimensions of the trailer, a position of a support point of the trailer, and a towing vehicle steering angle.

5. The method as recited in claim 4, wherein the dimensions of the trailer are determined from the sensor data using a dimension estimation algorithm.

6. The method as recited in claim 1, wherein the identification of the trailer in the sensor data is carried out using a deep learning algorithm.

7. The method as recited in claim 1, wherein the identification of the trailer in the respective sensor data is rejected if the factor is below the specified value.

8. The method as recited in claim 1, wherein a previously ascertained movement path of the trailer is used as a basis for the identification of the trailer in the respective sensor data.

9. The method as recited in claim 1, wherein the identification of the trailer is carried out during a detected state of the towing vehicle.

10. A device, comprising:
at least two different sensor types; and
a computer processing unit configured to ascertain a spatial orientation of a trailer of an autonomously driving towing vehicle with trailer, the computer processing unit configured to:
process respective sensor data of each of the two different sensor types to identify the trailer and objects in an environment in each of the respective sensor data;
combining the processed respective sensor data with one another; and
determine a movement path of the trailer relative to the objects in the environment based on the combined sensor data, wherein a factor is calculated indicating how reliably the trailer was identified in each of the respective sensor data, wherein when the factor is greater than or equal to a specified value, the sensor data is forwarded to the processing, the combining, and the determining, wherein a value of the factor varies depending on whether the respective sensor data is from a first one of the different sensor types or from a second one of the different sensor types.

11. A non-transitory machine-readable data carrier on which is stored a computer program for ascertaining a spatial orientation of a trailer of an autonomously driving towing vehicle with trailer, the computer program, when executed by one or more computers, causing the one or more computers to perform the following steps:
processing respective sensor data of each of a plurality of different sensor types to identify the trailer and objects in an environment in each of the respective sensor data;
combining the processed respective sensor data with one another; and
determining a movement path of the trailer relative to the objects in the environment based on the combined sensor data, wherein a factor is calculated indicating how reliably the trailer was identified in each of the respective sensor data, wherein when the factor is greater than or equal to a specified value, the sensor data is forwarded to the processing, the combining, and the determining, wherein a value of the factor varies depending on whether the respective sensor data is from a first one of the different sensor types or from a second one of the different sensor types.

12. A computer configured to ascertain a spatial orientation of a trailer of an autonomously driving towing vehicle with trailer, the computer configured to:
process respective sensor data of each of a plurality of different sensor types to identify the trailer and objects in an environment in each of the respective sensor data;
combine the processed respective sensor data with one another; and
determine a movement path of the trailer relative to the objects in the environment based on the combined sensor data, wherein a factor is calculated indicating how reliably the trailer was identified in each of the respective sensor data, wherein when the factor is greater than or equal to a specified value, the sensor data is forwarded to the processing, the combining, and the determining, wherein a value of the factor varies depending on whether the respective sensor data is from a first one of the different sensor types or from a second one of the different sensor types.

* * * * *